(12) United States Patent
Nagahara

(10) Patent No.: US 6,204,976 B1
(45) Date of Patent: Mar. 20, 2001

(54) ZOOM LENS

(75) Inventor: Akiko Nagahara, Koshigaya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/534,014

(22) Filed: Mar. 24, 2000

(30) Foreign Application Priority Data

Mar. 24, 1999 (JP) .................................................. 11-079890

(51) Int. Cl.[7] .................................................. G02B 15/14
(52) U.S. Cl. .......................................... 359/686; 359/683
(58) Field of Search .................................... 359/683, 676, 359/686

(56) References Cited

U.S. PATENT DOCUMENTS

| 5,157,550 | 10/1992 | Tsuchida et al. . | |
| 5,162,946 | * 11/1992 | Yamaguchi | 359/676 |
| 5,691,851 | * 11/1997 | Nishio et al. | 359/683 |
| 5,847,875 | * 12/1998 | Kodama et al. | 359/676 |

FOREIGN PATENT DOCUMENTS

| 10-20192 | 1/1998 | (JP) . |
| 10-186235 | 7/1998 | (JP) . |

* cited by examiner

*Primary Examiner*—Scott J. Sugarman
(74) *Attorney, Agent, or Firm*—Arnold International; Bruce Y. Arnold

(57) ABSTRACT

A zoom lens having a maximum of thirteen lens elements in four lens groups, the four lens groups being of negative, positive, positive, and positive refractive power, in order from the object side. The first lens group $G_1$ and the fourth lens group $G_4$, in order from the object side, are fixed in position relative to the image surface of the zoom lens, and the second lens group $G_2$ and the third lens group $G_3$ move with a mutual relationship for continuous zooming and correction for what would otherwise be a shifting of the image surface of the zoom lens with zooming. Further, certain conditions are preferably satisfied in order to provide a zoom lens that is compact, yet provides a bright image with well-corrected aberrations.

15 Claims, 12 Drawing Sheets

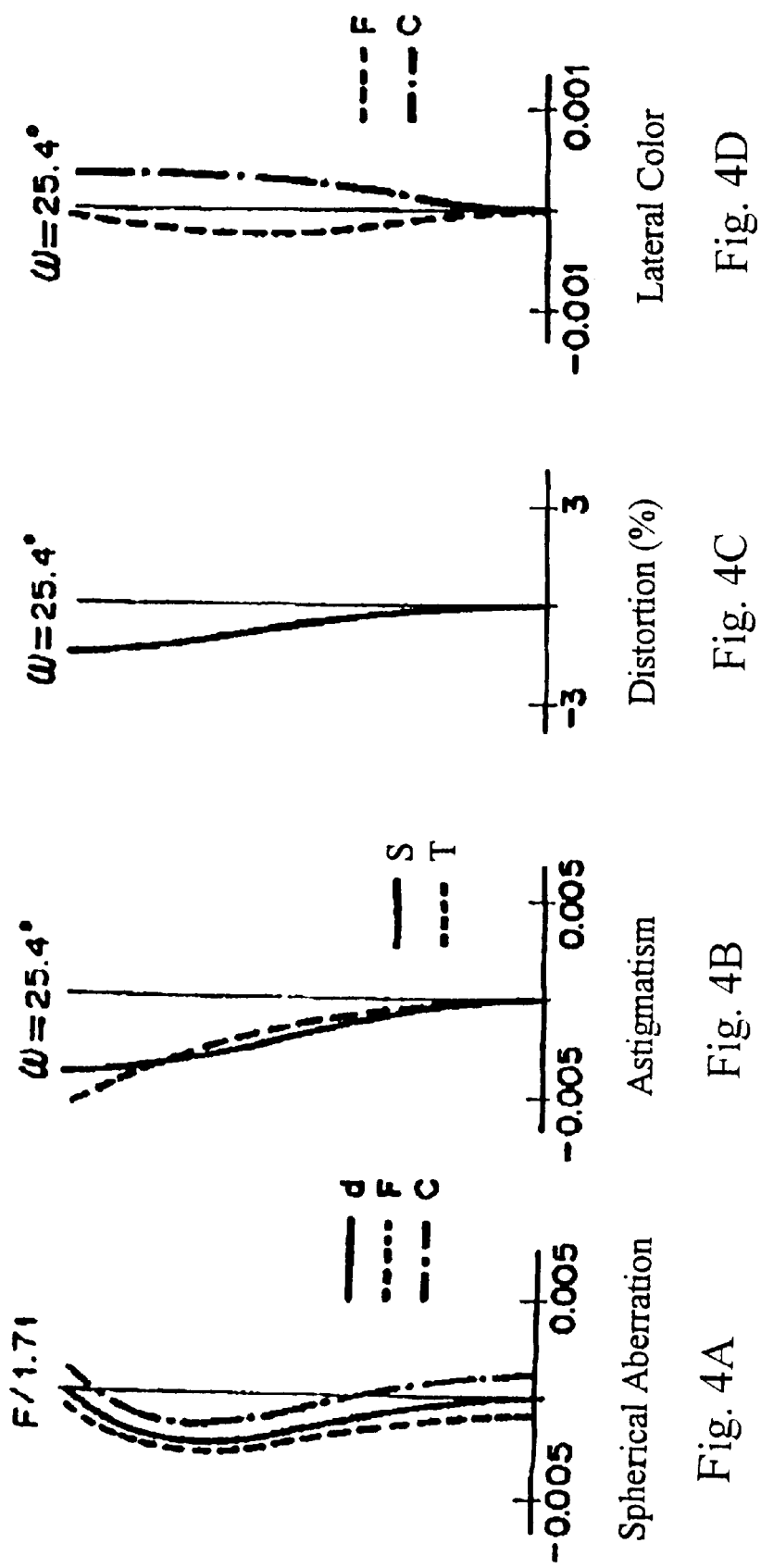

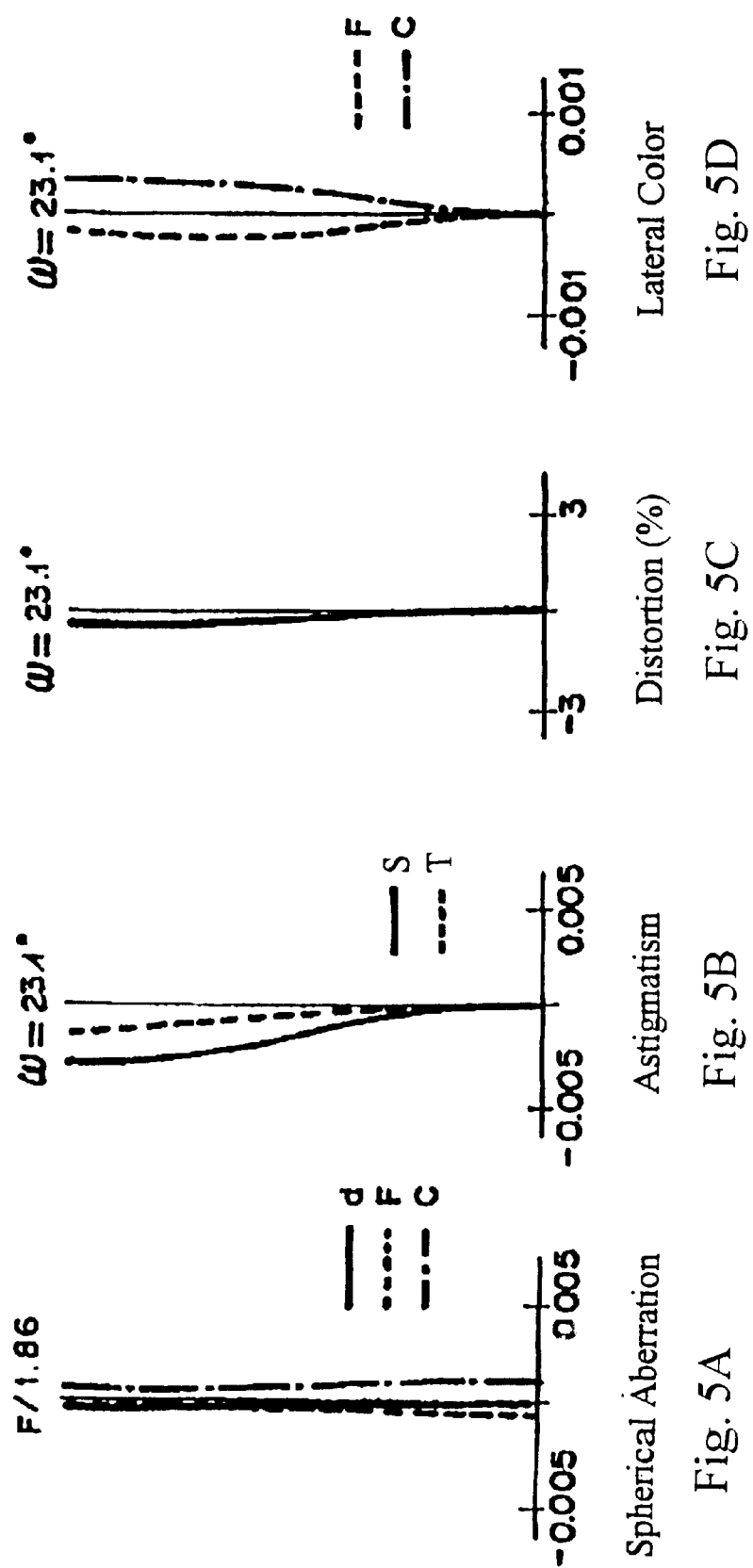

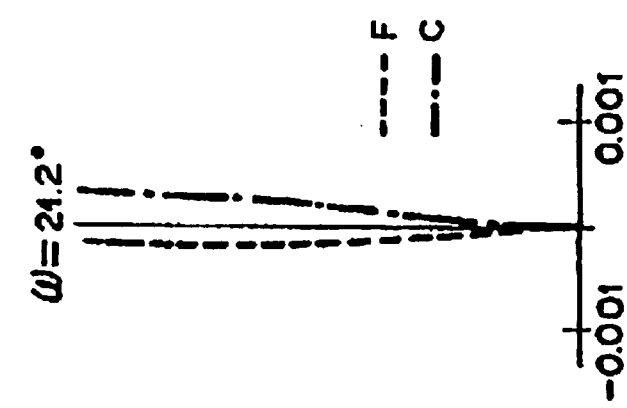
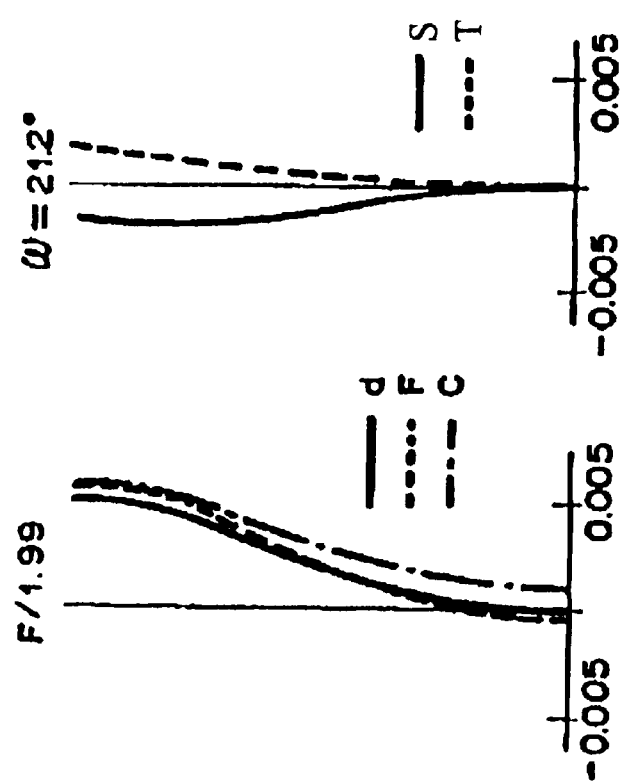
Fig. 6A  Fig. 6B  Fig. 6C  Fig. 6D

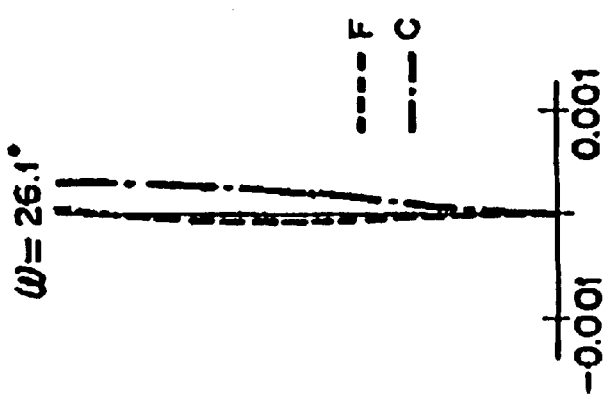
Fig. 7A Spherical Aberration
Fig. 7B Astigmatism
Fig. 7C Distortion (%)
Fig. 7D Lateral Color

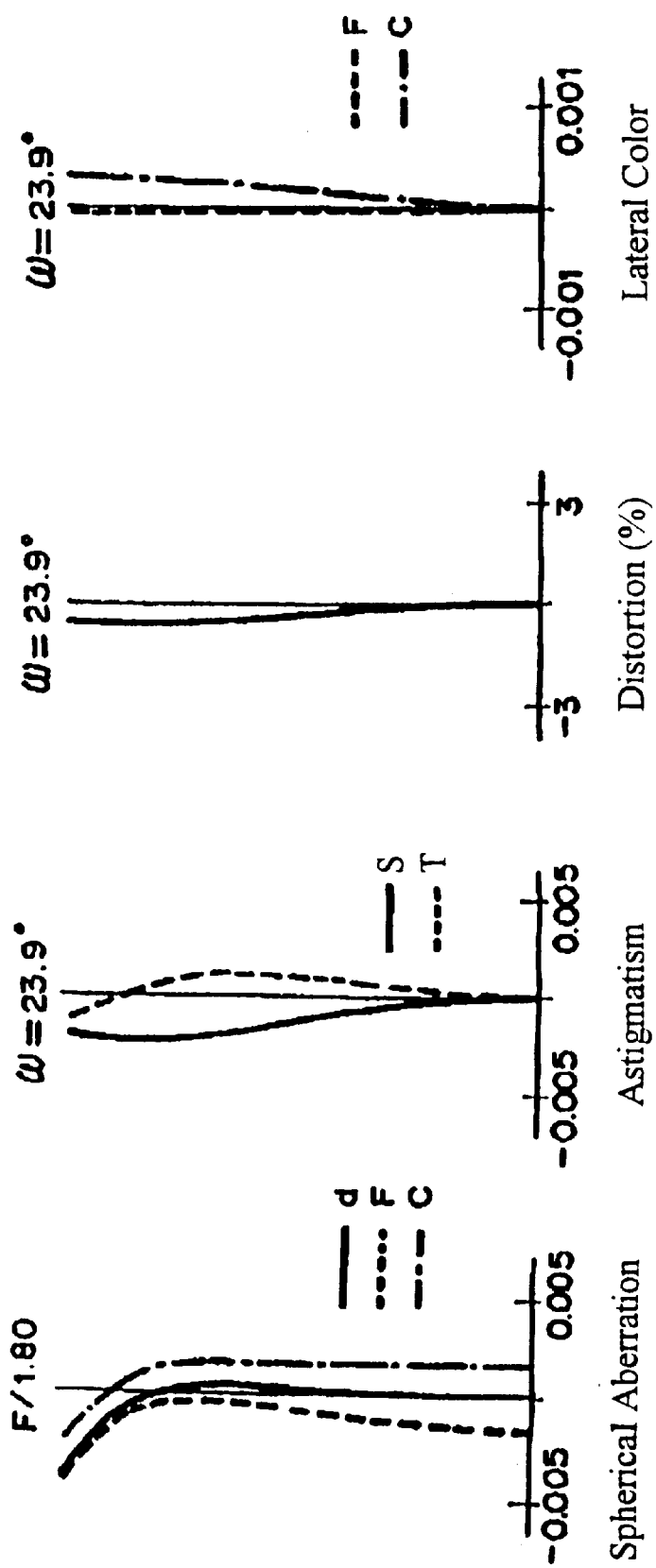

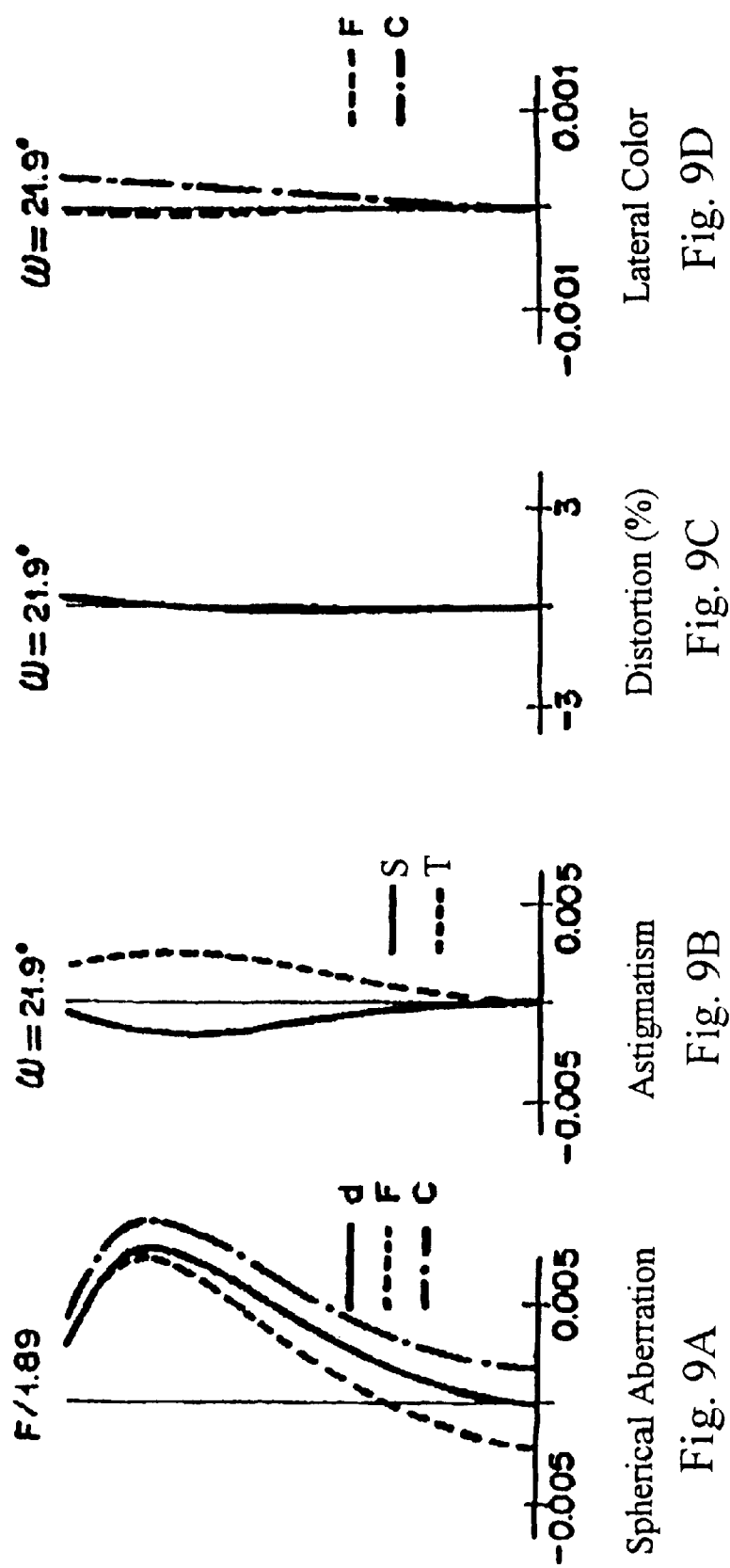

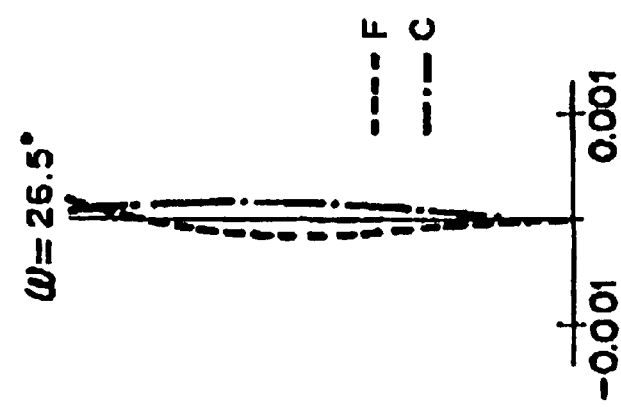
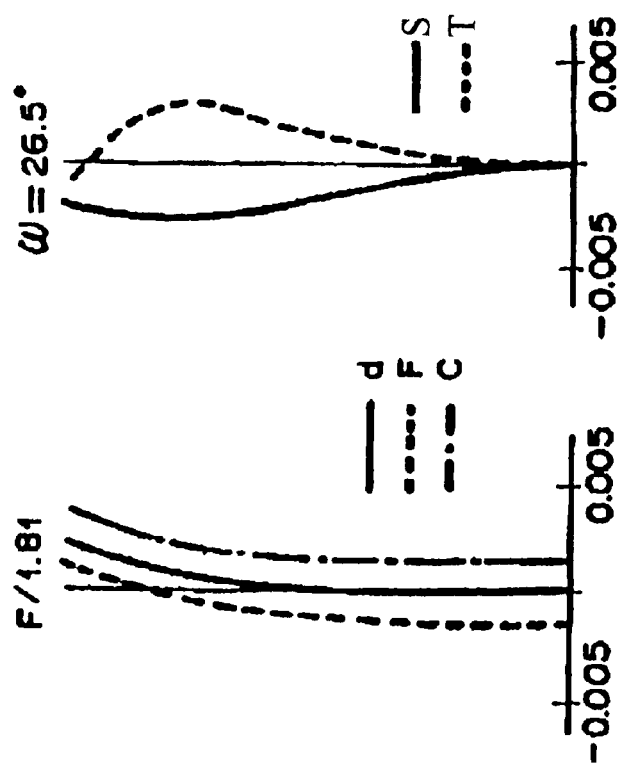

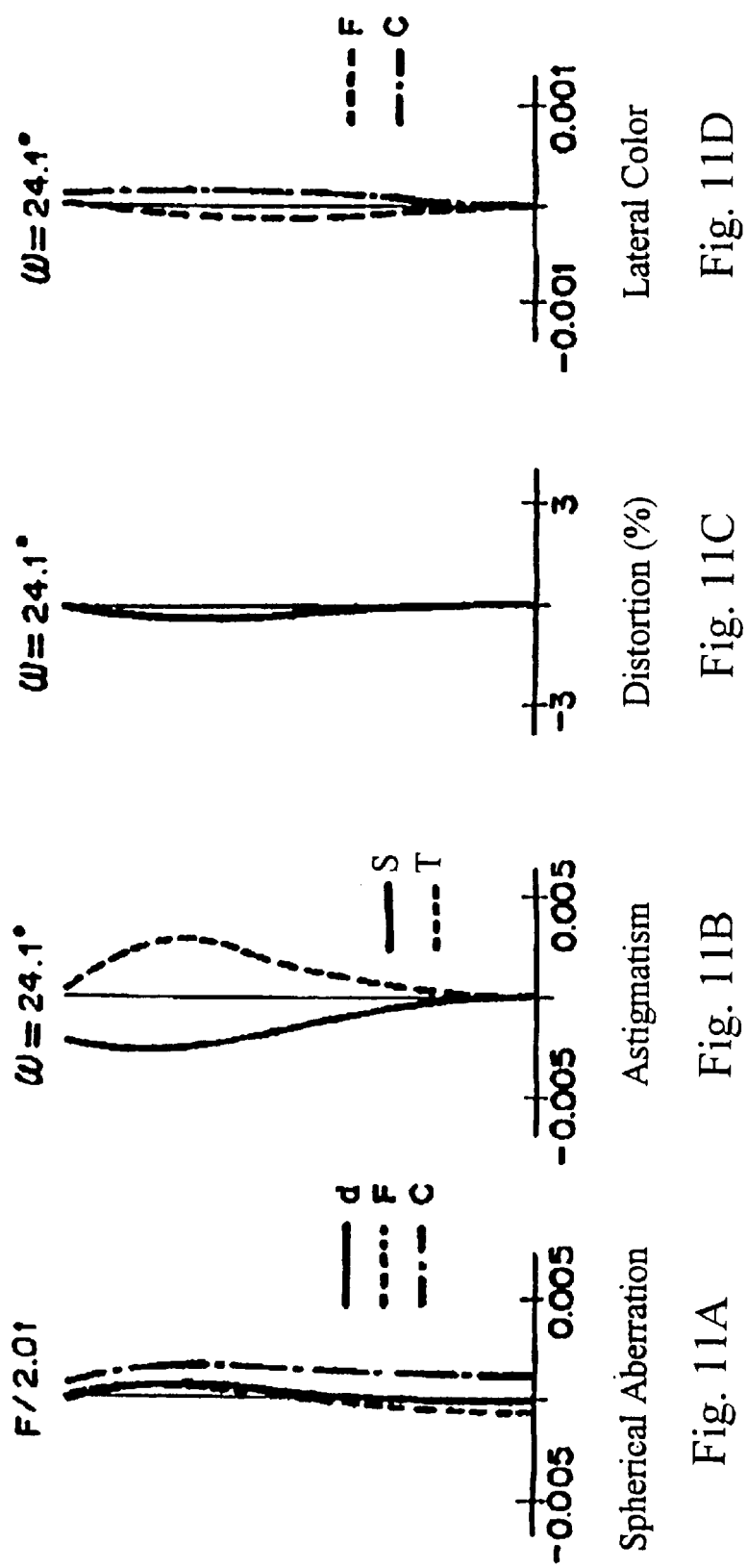

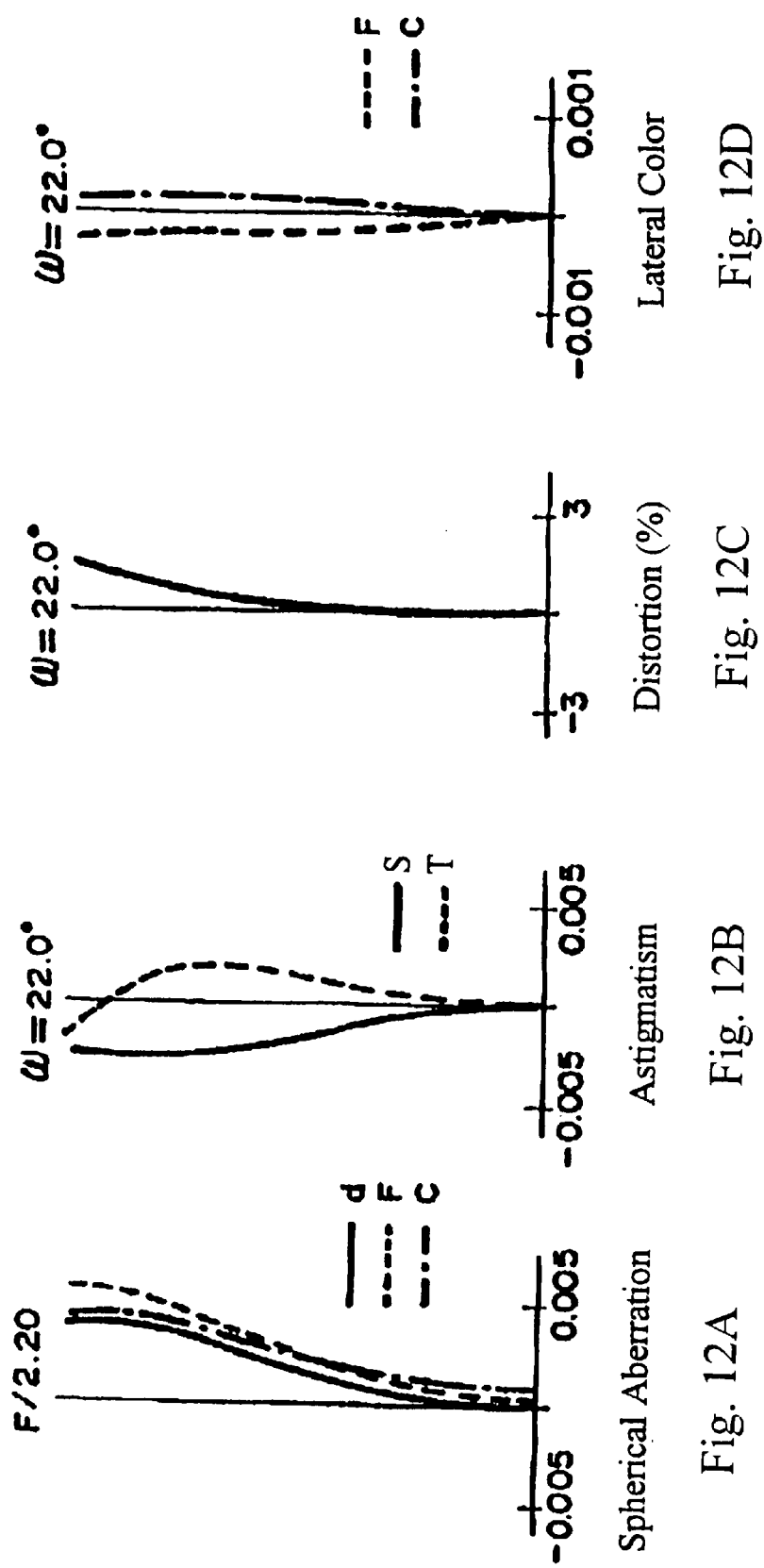
Fig. 12A Spherical Aberration
Fig. 12B Astigmatism
Fig. 12C Distortion
Fig. 12D Lateral Color

ZOOM LENS

BACKGROUND OF THE INVENTION

In recent years the requirements for a liquid crystal projector have been that it provide a sufficiently bright image so that a room in which it is used does not have to be darkened in order to view the projected information, that the liquid crystal projector be portable as a result of being compact and lightweight, and that the liquid crystal projector have a high resolution. Such a projector places special demands on the lens that is used to project the light from the liquid crystal display, as the lens must provide a bright image, have excellent resolving power, and yet be compact. Because a projection lens for a color liquid-crystal projector needs to have a beam-combiner on its reducing side for synthesizing the three component colors which are combined to form the projected information, the projection lens must have a large back focus. Further, the zoom lens should be substantially telecentric.

As a zoom lens for such a liquid crystal projector, Japanese Laid Open Patent Application H10-20192 is known. However, in this zoom lens the brightness of the image is not sufficient as described above, since the $F_{NO}$ (being near 2.3) is not sufficiently low to enable projected information to be viewed without the room being darkened. Furthermore, the aberrations of this zoom lens are not sufficiently well-corrected so as to provide the image resolution required. The requirement that the zoom lens simultaneously provide a high resolution and have a small $F_{NO}$ make the design of such a lens more difficult, since the focal depth becomes smaller as the $F_{NO}$ becomes smaller.

As a zoom lens having sufficiently well-corrected aberrations to be used in such a projector, Japanese Laid Open Patent Application H10-186235 is an example. This zoom lens consists of five lens groups, of which three lens groups move during zooming. However, even in this zoom lens, the brightness of the projected image is not sufficient so that it can be used to project images in a room that has not been darkened. Also, having three lens group that move make the lens more complex, and thus make it difficult keep the lens lightweight and of low cost.

BRIEF SUMMARY OF THE INVENTION

This invention relates to a zoom lens, especially one that can be used as a projection zoom lens in a projector that uses a liquid crystal display, as a zoom lens of a video camera, or as a zoom lens of a photographic camera that uses solid-state imaging elements, such as a CCD array. The object of the present invention is to provide a compact and lightweight zoom lens formed of only four lens groups, of which two lens groups are moveable, which provides a bright image with well-corrected aberrations, a back focus that is sufficiently long to enable optical components to be inserted between the image-side lens surface and the image, and which is substantially telecentric.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4D show the spherical aberration, astigmatism, distortion (%), and lateral color, respectively, at the wide-angle end of the zoom lens of Embodiment 1, FIGS. 5A–5D show the spherical aberration, astigmatism, distortion (%), and lateral color, respectively, at the mid-position of the zoom lens of Embodiment 1, FIGS. 6A–6D show the spherical aberration, astigmatism, distortion (%), and lateral color, respectively, at the telephoto end of the zoom lens of Embodiment 1, FIGS. 7A–7D show the spherical aberration, astigmatism, distortion (%), and lateral color, respectively, at the wide-angle end of the zoom lens of Embodiment 2, FIGS. 8A–8D show the spherical aberration, astigmatism, distortion (%), and lateral color, respectively, at the mid-position of the zoom lens of Embodiment 2, FIGS. 9A–9D show the spherical aberration, astigmatism, distortion (%), and lateral color, respectively, at the telephoto end of the zoom lens of Embodiment 2, FIGS. 10A–10D show the spherical aberration, astigmatism, distortion (%), and lateral color, respectively, at the wide-angle end of the zoom lens of Embodiment 3, FIGS. 11A–11D show the spherical aberration, astigmatism, distortion (%), and lateral color, respectively, at the mid-position of the zoom lens of Embodiment 3, and FIGS. 12A–12D show the spherical aberration, astigmatism, distortion (%), and lateral color, respectively, at the telephoto end of the zoom lens of Embodiment 3.

DETAILED DESCRIPTION

The zoom lens of this invention is formed of four sequential lens groups, in order from the most object side, of negative, positive, positive, and positive refractive power, respectively. The first lens group $G_1$ is fixed in position, the second lens group $G_2$ and the third lens group $G_3$ move with a mutual relationship for continuous zooming and correction of what otherwise would be a shifting of the image surface with zooming, and the fourth lens group $G_4$ is fixed in position. Further, the following Condition (1) is preferably satisfied:

$$\beta_2 \times \beta_3 > -2.2 \qquad \text{Condition (1)}$$

where $\beta_2$ is the lateral magnification of the second lens group at the wide-angle end, and $\beta_3$ is the lateral magnification of the third lens group at the wide-angle end.

It is also preferred that the fourth lens group $G_4$ contains at least one negative lens element that has strong refractive power on the image side, that this negative lens element has a meniscus shape with its convex surface on the object side, and that this negative lens element satisfies the following Condition (2).

$$\nu < 30 \qquad \text{Condition (2)}$$

where $\nu$ is the Abbe number.

Further, it is additionally preferred that the second lens group $G_2$ and the third lens group $G_3$ are constructed so that when zooming from the wide-angle end to the telephoto end these two lens groups move toward the object side (i.e., the enlarging side, when the zoom lens of the invention is used as a projection lens) as well as move closer together.

Also, it is preferred that the third lens group $G_3$ is formed of a positive lens element and a negative lens element.

Still further, it is preferred that the following Conditions (3)–(6) are satisfied:

$-1.2 < f_1/F < -0.7$      Condition (3)

$0.7 < f_2/F < 1.5$      Condition (4)

$1.0 < f_3/F < 4.5$      Condition (5)

$1.0 < f_4/F < 1.8$      Condition (6)

where

F is the focal length of the zoom lens at the wide-angle end, $f_1$ is the focal length of the first lens group $G_1$, $f_2$ is the focal length of the second lens group $G_2$, $f_3$ is the focal length of the third lens group $G_3$, and $f_4$ is the focal length of the fourth lens group $G_4$.

Figure 1:
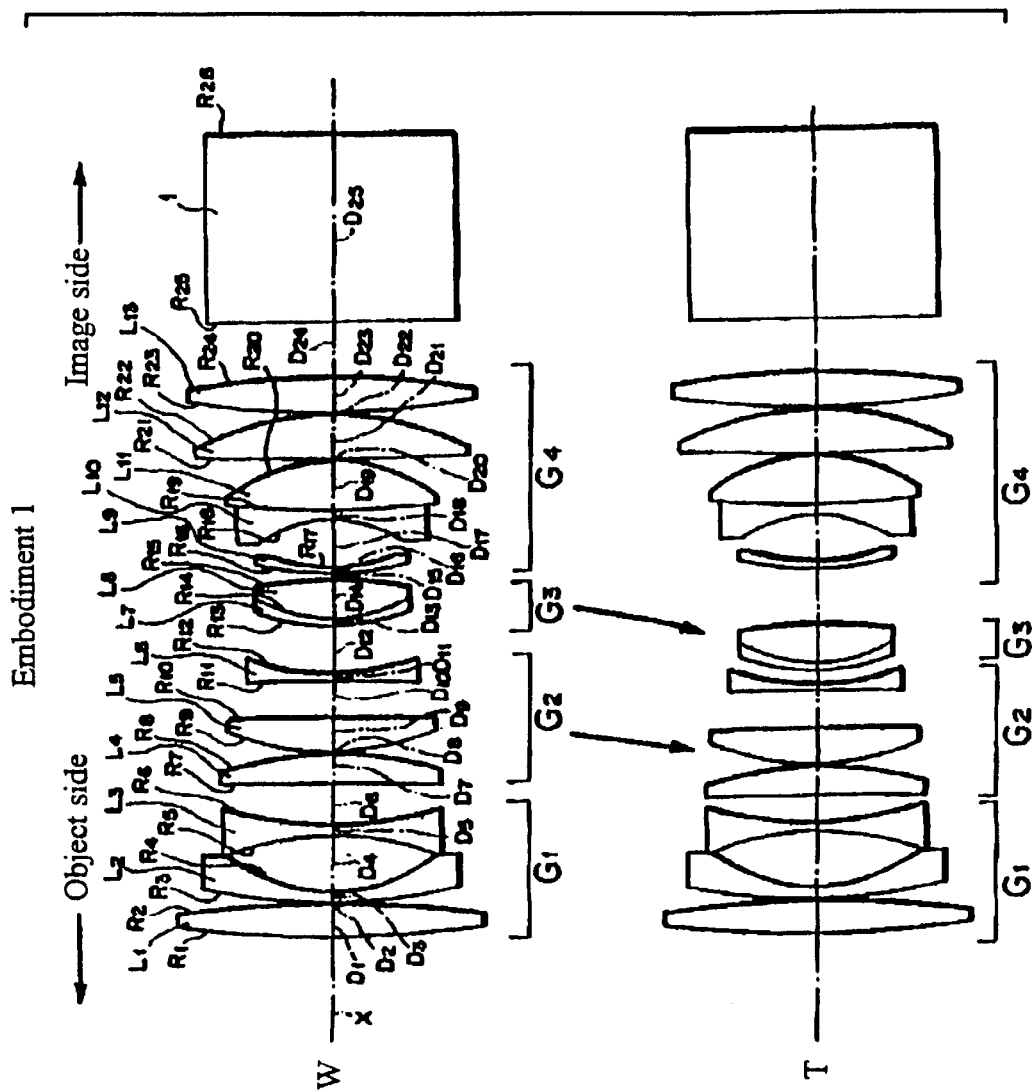
FIG. 1 shows the basic lens element configuration of Embodiment 1 of the present invention at both the wide-angle end W and the telephoto end T.
Figure 2:
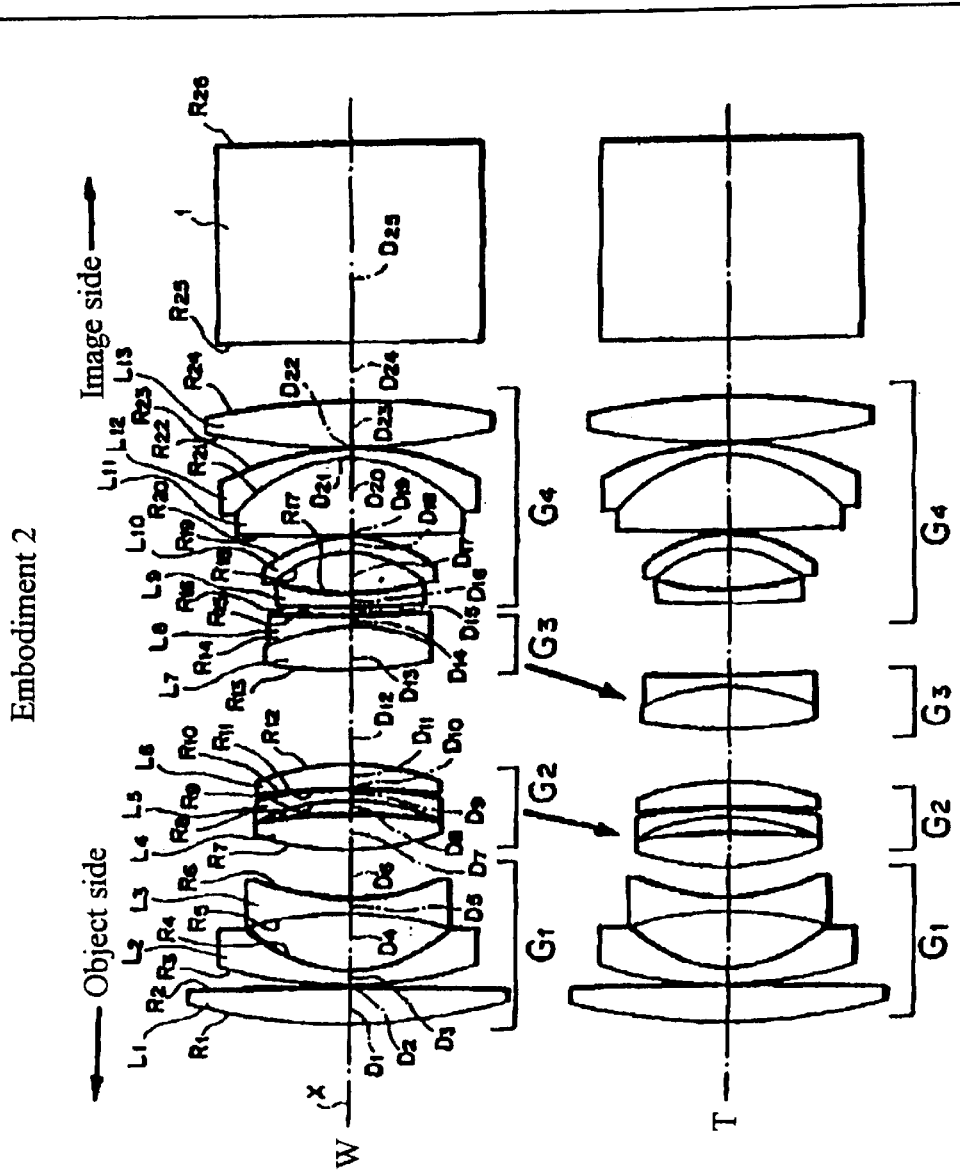
FIG. 2 shows the basic lens element configuration of Embodiment 2 of the present invention at both the wide-angle end W and the telephoto end T.
Figure 3:
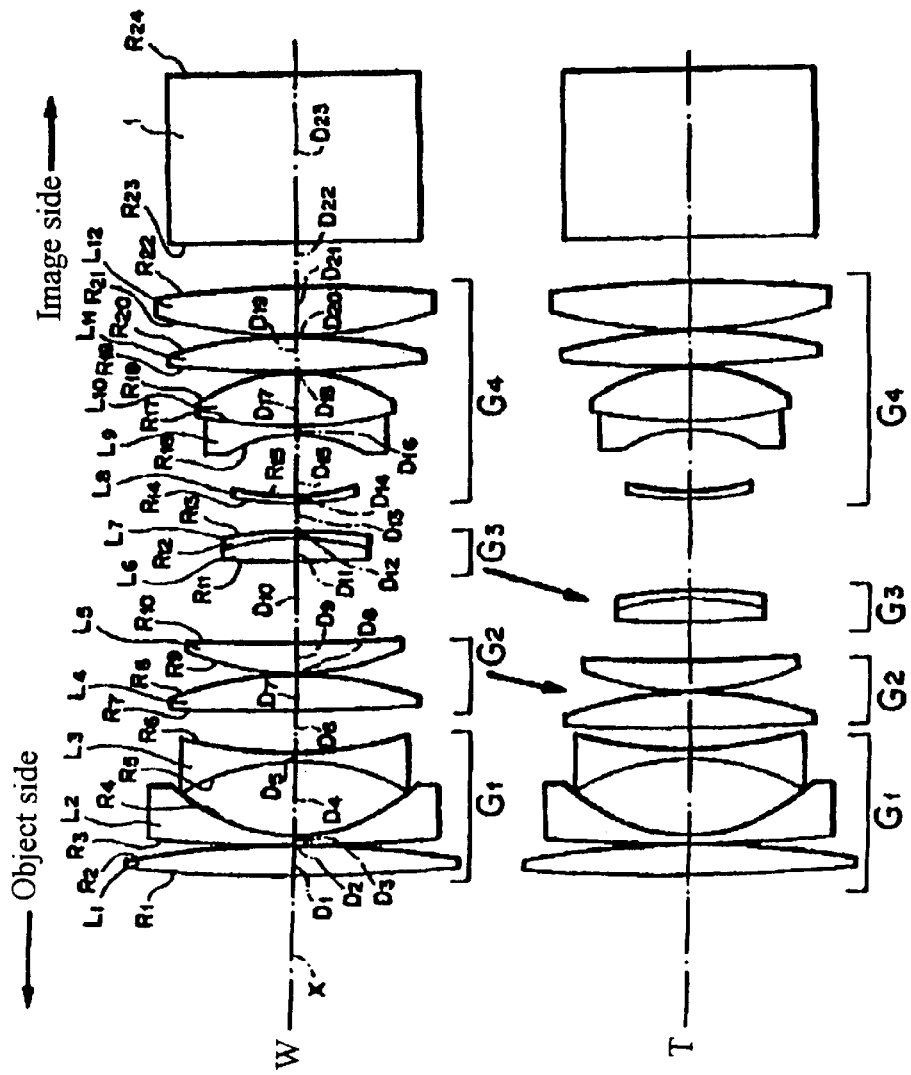
FIG. 3 shows the basic lens element configuration of Embodiment 3 of the present invention, at both the wide-angle end W and the telephoto end T.

FIGS. 1–3 show the basic lens element construction of Embodiments 1–3, of the invention, respectively.

As shown in FIGS. 1–3, the zoom lens of the present invention employs a maximum of thirteen lens elements in four lens groups. In order from the object side, the first lens group $G_1$ has negative refractive power and is fixed in position, the second lens group $G_2$ and the third lens group $G_3$ each has positive refractive power and move with a mutual relationship for continuous zooming and correction for what would otherwise be movement of the image plane during zooming. The fourth lens group $G_4$ has positive refractive power and is fixed in position. The back focus of the zoom lens is sufficient to accommodate a color composition optical system 1 between the last surface of the fourth lens group $G_4$ and the image plane. In FIGS. 1–3, X indicates the optical axis. In the zoom lens of all three specific embodiments given, the fourth lens group $G_4$ includes at least one negative lens element that satisfies Condition (2) and has a meniscus shape with its convex surface on the object side. As used herein, the object side corresponds to the enlarging side when the zoom lens of the invention is used as a projection lens. In Embodiments 1 and 2, this negative lens element is the ninth lens element $L_9$; in Embodiment 3, this negative lens element is the eighth lens element $L_8$.

Also, the second lens group $G_2$ and the third lens group $G_3$ are constructed so that they move toward the object side and become closer together when zooming from the wide-angle end to the telescopic end. This enables the overall length of the zoom lens to be more compact. Further, the third lens group $G_3$ includes both a positive lens element and a negative lens element.

In Embodiment 1, the third lens group $G_3$ is formed of a seventh lens element $L_7$ of negative meniscus shape and an eighth lens element $L_8$ that is biconvex. In Embodiment 2, the third lens group $G_3$ is formed of a seventh lens element $L_7$ that is biconvex and an eighth lens element $L_8$ that is biconcave. In Embodiment 3, the third lens group $G_3$ is formed of a sixth lens element $L_6$ that is biconvex and a seventh lens element $L_7$ that has a negative meniscus shape, thereby enabling the chromatic aberration to be well-corrected. In Embodiments 1 and 2, the seventh lens element $L_7$ and the eighth lens element $L_8$ in the third lens group $G_3$ may be separate or joined. Similarly, in Embodiment 3, the sixth lens element $L_6$ and the seventh lens element $L_7$ may be separate or joined. Furthermore, the zoom lens of these embodiments satisfies the above Conditions (1)–(6).

Conditions (1)–(6) will now be explained. Condition (1) insures that various aberrations are favorably corrected during zooming while keeping the total length of the zoom lens short. This is accomplished by ensuring that the product of the image magnification $\beta_2$ of the second lens group $G_2$ times the image magnification $\beta_3$ of the third lens group $G_3$ exceeds the value of minus 2.2.

In a conventional zoom lens, movement of a positive refractive power lens group arranged on the object side of the zoom lens for zooming causes the image plane to shift. A negative moving lens group positioned immediately before a fixed lens group is believed to mainly correct for this image plane shift. Therefore, by the present invention, shifting of the image plane is greatly reduced, thereby enabling the amount of displacement of such a negative moving lens group for correcting displacement of this image plane to be nearly infinitesimal. Therefore, if the magnification of the positive moving lens group is near unity, displacement of the image plane can be suppressed so as to be nearly infinitesimal. If the moving group is divided into two moving lens groups in order to balance aberrations, it becomes possible to sufficiently correct for shifting of the image plane even if the negative lens group is made to be fixed, as in the present invention. Thus, the present invention enables the various aberrations to be well-corrected in a four-group zoom lens despite only two of the lens groups being moveable, and allows the overall length of the zoom lens to be short.

In this Condition (1), if the $\beta_2 \times \beta_3$ value falls below the lower limit, image plane correction by the moving group only becomes difficult, and if zooming is done while keeping the total length short, it becomes difficult to correct various aberrations.

Condition (2) insures that chromatic aberration is well-corrected by regulating the Abbe number $\nu$ of a negative lens element which has a strong refractive power on the image side, with at least one such lens element being contained in the fourth lens group $G_4$. If the value of Condition (2), exceeds the upper limit, chromatic aberration becomes difficult to correct.

Conditions (3)–(5) insure that the total length of the zoom lens does not become too large and, additionally insures that various aberrations are favorably corrected by regulating, at the wide-angle end, the refractive power of the first, second and third lens groups relative to the overall refractive power of the zoom lens.

If the lower limits of Conditions (3)–(5) are not satisfied, it becomes difficult to favorably correct various aberrations. On the other hand, if the upper limits of Conditions (3)–(5) are exceeded, the displacements of lens groups $G_2$ and $G_3$ during zooming become excessive.

Condition (6) is insures that an appropriate back focus amount is provided by regulating the ratio $f_4/F$ (the ratio of the focal length of the fourth lens group $G_4$ divided by the focal length of the zoom lens at the wide-angle end, while at the same time insuring the zoom lens is telecentric.

In Condition (6), if the value of $f_4/F$ falls below the lower limit, the back focus becomes too short, causing the light intensity at the periphery of a projected image, when the lens is used as a projection lens for a LCD display, to decrease too much.

The three specific embodiments of the invention will now be set forth in detail.

Embodiment 1

As shown in FIG. 1, the zoom lens of Embodiment 1 consists of 13 lens elements. The first lens group $G_1$ is formed, in order from the object side, of a first lens element $L_1$ that is biconvex, a second lens element $L_2$ that has a negative meniscus shape with its convex surface on the object side, and a third lens element $L_3$ that is biconcave.

The second lens group $G_2$ is formed, in order from the object side, of a fourth lens element $L_4$ having a positive meniscus shape with its convex surface on the image side, a fifth lens element $L_5$ having a positive meniscus shape with its convex surface on the object side, and a sixth lens element $L_6$ having a negative meniscus shape with its convex surface on the object side.

The third lens group $G_3$ is formed, in order from the object side, of a seventh lens element $L_7$ having a negative meniscus shape with its concave surface on the image side and joined to an eighth lens element $L_8$ shaped as a biconvex lens.

The fourth lens group $G_4$ is formed, in order from the object side, of a ninth lens element $L_9$ having a negative meniscus shape with its convex surface on the object side, a tenth lens element $L_{10}$ biconcave, an eleventh lens element $L_{11}$ that is biconvex, a twelfth lens element $L_{12}$ biconvex, and a thirteenth lens element $L_{13}$ that is biconvex. The tenth lens element $L_{10}$ eleventh lens element $L_{11}$ are joined by being cemented together.

Table 1 below lists the surface #, in order from the object side, the radius of curvature R (in mm) of each surface, the on-axis surface spacing D, as well as the refractive index $N_d$ and the Abbe number $v_d$ (at the sodium d line) of each lens element of Embodiment 1. In the middle portion of the table are listed the values of D6, D12, and D15 (i.e., the lens group spacings) at the wide-angled end, the middle position, and the telephoto end. In the bottom portion of the table, the values corresponding to Conditions (1)–(6) are listed. The lens data listed is normalized (i.e., is for a zoom lens having a focal length F equal to 1.0) and is for an object at infinity.

TABLE 1

| # | R | D | $N_d$ | $v_d$ |
|---|---|---|---|---|
| 1 | 5.584 | 0.173 | 1.77250 | 49.6 |
| 2 | −5.584 | 0.007 | | |
| 3 | 2.823 | 0.050 | 1.48749 | 70.2 |
| 4 | 0.778 | 0.312 | | |
| 5 | −1.225 | 0.043 | 1.71736 | 29.5 |
| 6 | 1.811 | D6 (variable) | | |
| 7 | −64.977 | 0.160 | 1.84666 | 23.9 |
| 8 | −1.631 | 0.007 | | |
| 9 | 1.163 | 0.185 | 1.83400 | 37.2 |
| 10 | 89.027 | 0.210 | | |
| 11 | 24.256 | 0.040 | 1.48749 | 70.2 |
| 12 | 1.073 | D12(variable) | | |
| 13 | 0.945 | 0.040 | 1.84666 | 23.9 |
| 14 | 0.663 | 0.217 | 1.48749 | 70.2 |
| 15 | −2.115 | D15 (variable) | | |
| 16 | 1.291 | 0.032 | 1.84666 | 23.9 |
| 17 | 0.816 | 0.270 | | |
| 18 | −0.546 | 0.047 | 1.84666 | 23.9 |
| 19 | 4.097 | 0.276 | 1.58913 | 61.1 |
| 20 | −0.757 | 0.007 | | |
| 21 | 21.038 | 0.242 | 1.77250 | 49.6 |
| 22 | −1.347 | 0.007 | | |
| 23 | 4.006 | 0.188 | 1.84666 | 23.9 |
| 24 | −4.006 | 0.288 | 1.51633 | 64.1 |
| 25 | ∞ | 1.109 | 1.51633 | 64.1 |
| 26 | ∞ | | | |

| | D6 | D12 | D15 |
|---|---|---|---|
| Wide-angle end | 0.228 | 0.266 | 0.034 |
| Mid-position | 0.180 | 0.175 | 0.173 |
| Telephoto end | 0.144 | 0.083 | 0.301 |

TABLE 1-continued

Condition (1) value: $\beta_2 \times \beta_3$ = −1.63 to −1.95
Condition (2) value: $v$ = 23.9
Condition (3) value: $f_1/F$ = −0.85
Condition (4) value: $f_2/F$ = 1.04
Condition (5) value: $f_3/F$ = 1.73
Condition (6) value  $f_4/F$ = 1.38

As listed in Table 1, the $\beta_2 \times \beta_3$ value is minus 1.63 to minus 1.95, the $v$ value is 23.9, the $f_1/F$ value is −0.85, the $f_2/F$ value is 1.04, the $f_3/F$ is 1.73, and the $f_4/F$ value is 1.38, satisfying each of Conditions (1)–(6).

FIGS. 4A–6D show various aberrations for Embodiment 1 of the invention. FIGS. 4A–4D show the spherical aberration (for the d, F, and C lines), astigmatism (in the sagittal S and tangential T planes), distortion, and lateral color (for the F and C lines), respectively, at the wide-angle end, FIGS. 5A–5D show these same aberrations at the mid position, and FIGS. 6A–6D show these same aberrations at the telephoto end.

Embodiment 2

Whereas the zoom lens of Embodiment 2 also employs thirteen lens elements in four lens groups as in Embodiment 1, the shapes of lens elements in the second through fourth lens groups vary somewhat from those of Embodiment 1. Namely, in order from the object side, the second lens group $G_2$ is formed of a fourth lens element $L_4$ that is biconvex, a fifth lens element $L_5$ having a negative meniscus shape with its convex surface on the image side, and a sixth lens element $L_6$ having a positive meniscus shape with its convex surface on the image side.

The third lens group $G_3$ is formed, in order from the object side, of a seventh lens element $L_7$ of biconvex shape and an eighth lens element $L_8$ of biconcave shape, with these two lens elements joined by being cemented together.

The fourth lens group $G_4$ is formed, in order from the object side, of a ninth lens element $L_9$ of positive meniscus shape with its convex surface on the object side, a tenth lens element $L_{10}$ of negative meniscus shape with its convex surface on the image side, an eleventh lens element $L_{11}$ of biconvex shape, a twelfth lens element $L_{12}$ of negative meniscus shape with its convex surface on the image side, and a thirteenth lens element $L_{13}$ that is biconvex. The eleventh lens element $L_{11}$ and the twelfth lens element $L_{12}$ are joined by being cemented together.

Table 2 below lists the surface #, in order from the object side, the radius of curvature R (in mm) of each surface, the on-axis surface spacing D, as well as the refractive index $N_4$ and the Abbe number $v_d$ (at the sodium d line) of each lens element of Embodiment 2. In the middle portion of the table are listed the values of D6, D12, and D15, (i.e., the lens group spacings) at the wide-angle end, the middle position, and the telephoto end. In the bottom portion of the table, the values corresponding to Conditions (1)–(6) are listed. The lens data listed is normalized (i.e., is for a zoom lens having a focal length F equal to 1.0) and is for an object at infinity.

TABLE 2

| # | R | D | $N_d$ | $v_d$ |
|---|---|---|---|---|
| 1 | 2.587 | 0.204 | 1.80610 | 40.9 |
| 2 | −38.599 | 0.007 | | |

TABLE 2-continued

| # | R | D | $N_d$ | $\nu_d$ |
|---|---|---|---|---|
| 3 | 1.907 | 0.082 | 1.62041 | 60.4 |
| 4 | 0.669 | 0.291 | | |
| 5 | -1.676 | 0.075 | 1.49700 | 81.6 |
| 6 | 0.997 | D6 (variable) | | |
| 7 | 1.242 | 0.187 | 1.74077 | 27.8 |
| 8 | -2.620 | 0.072 | | |
| 9 | -0.955 | 0.052 | 1.84666 | 23.9 |
| 10 | -2.456 | 0.006 | | |
| 11 | -4.424 | 0.127 | 1.74320 | 49.3 |
| 12 | -1.110 | D12 (variable) | | |
| 13 | 1.997 | 0.228 | 1.71300 | 53.9 |
| 14 | -0.812 | 0.052 | 1.64769 | 33.8 |
| 15 | 13.325 | D15 (variable) | | |
| 16 | 4.201 | 0.067 | 1.84666 | 23.9 |
| 17 | 1.109 | 0.223 | | |
| 18 | -0.490 | 0.086 | 1.84666 | 23.9 |
| 19 | -0.598 | 0.006 | | |
| 20 | 18.073 | 0.410 | 1.62041 | 60.3 |
| 21 | -0.657 | 0.063 | 1.84666 | 23.9 |
| 22 | -1.208 | 0.006 | | |
| 23 | 3.033 | 0.233 | 1.84666 | 23.9 |
| 24 | -3.130 | 0.299 | | |
| 25 | ∞ | 1.150 | 1.51633 | 64.1 |
| 26 | ∞ | | | |

| | D6 | D12 | D15 |
|---|---|---|---|
| Wide-angle end | 0.259 | 0.514 | 0.049 |
| Mid-position | 0.197 | 0.402 | 0.223 |
| Telephoto end | 0.148 | 0.287 | 0.386 |
| Condition (1) value: | $\beta_2 \times \beta_3$ = -1.59 to -1.90 | | |
| Condition (2) value: | $\nu$ = 23.9 | | |
| Condition (3) value: | $f_1/F$ = -0.98 | | |
| Condition (4) value: | $f_2/F$ = 1.23 | | |
| Condition (5) value: | $f_3/F$ = 2.58 | | |
| Condition (6) value | $f_4/F$ = 1.60 | | |

As listed in Table 2 the $\beta_2 \times \beta_3$ value varies from minus 1.59 to minus 1.90, the $\nu$ value is 23.9, the value of $f_1/F$ is -0.98, the value of $f_2/F$ is 1.23, the value of $f_3/F$ is 2.58, and the value of $f_4/F$ is 1.60, satisfying each of Conditions (1)–(6).

FIGS. 7A–9D show various aberrations for Embodiment 2 of the invention. FIGS. 7A–7D show the spherical aberration (for the d, F, and C lines), astigmatism (in the sagittal S and tangential T planes), distortion, and lateral color (for the F and C lines), respectively, at the wide-angle end, FIGS. 8A–8D show these same aberrations at the mid position, and FIGS. 9A–9D show these same aberrations at the telephoto end.

Embodiment 3

The zoom lens of this embodiment employs only twelve lens elements in four lens groups, and thus is simpler in construction than the zoom lens of Embodiments 1 and 2. In this embodiment the second lens group $G_2$ is formed of only two lens elements and the construction of the lens elements in the third lens group $G_3$ are different from Embodiments 1 and 2.

Namely, the second lens group $G_2$ is formed of, in sequential order from the object side, a fourth lens element $L_4$ that is biconvex and a fifth lens element $L_5$ that has a positive meniscus shape with its convex surface on the object side.

The third lens group $G_3$ is formed of, in sequential order from the object side, a sixth lens element $L_6$ that is biconvex and a seventh lens element $L_7$ that has a negative meniscus shape with its convex surface on the image side, with these lens elements being joined by being cemented together.

Table 3 below lists the surface #, in order from the object side, the radius of curvature R (in mm) of each surface, the on-axis surface spacing D, as well as the refractive index $N_d$ and the Abbe number $V_d$ (at the sodium d line) of each lens element of Embodiment 3. In the middle portion of the table are listed the values of D6, D10, and D13, (i.e., the lens group spacings) at the wide-angle end, the middle position, and the telephoto end. In the bottom portion of the table, the values corresponding to Conditions (1)–(6) are listed. The lens data listed is normalized (i.e., is for a zoom lens having a focal length F equal to 1.0) and is for an object at infinity.

TABLE 3

| # | R | D | $N_d$ | $\nu_d$ |
|---|---|---|---|---|
| 1 | 9.078 | 0.158 | 1.77250 | 49.6 |
| 2 | -4.275 | 0.004 | | |
| 3 | 12.521 | 0.041 | 1.48749 | 70.4 |
| 4 | 0.833 | 0.376 | | |
| 5 | -1.024 | 0.041 | 1.53172 | 48.8 |
| 6 | 1.727 | D6 (variable) | | |
| 7 | 9.101 | 0.190 | 1.74330 | 49.2 |
| 8 | -1.518 | 0.004 | | |
| 9 | 1.164 | 0.152 | 1.80610 | 40.7 |
| 10 | 5.808 | D10 (variable | | |
| 11 | 9.235 | 0.120 | 1.71300 | 53.9 |
| 12 | -1.177 | 0.031 | 1.84666 | 23.8 |
| 13 | -2.647 | D13 (variable) | | |
| 14 | 1.361 | 0.031 | 1.84666 | 23.8 |
| 15 | 0.915 | 0.338 | | |
| 16 | -0.567 | 0.041 | 1.84666 | 23.8 |
| 17 | 1.902 | 0.291 | 1.60311 | 60.7 |
| 18 | -0.762 | 0.004 | | |
| 19 | 4.857 | 0.182 | 1.84666 | 23.8 |
| 20 | -2.201 | 0.004 | | |
| 21 | 2.254 | 0.243 | 1.80610 | 40.7 |
| 22 | -5.337 | 0.226 | | |
| 23 | ∞ | 0.883 | 1.51633 | 64.1 |
| 24 | ∞ | | | |

| | D6 | D10 | D13 |
|---|---|---|---|
| Wide-angle end | 0.229 | 0.445 | 0.166 |
| Mid-position | 0.166 | 0.335 | 0.339 |
| Telephoto end | 0.116 | 0.220 | 0.505 |
| Condition (1) value: | $\beta_2 \times \beta_3$ = -1.41 to -1.69 | | |
| Condition (2) value: | $\nu$ = 23.9 | | |
| Condition (3) value: | $f_1/F$ = -0.85 | | |
| Condition (4) value: | $f_2/F$ = 0.89 | | |
| Condition (5) value: | $f_3/F$ = 3.54 | | |
| Condition (6) value | $f_4/F$ = 1.28 | | |

As listed in Table 3 the $\beta_2 \times \beta_3$ value is minus 1.41 to minus 1.69, the $\nu$ value is 23.9, the value of $f_1/F$ is -0.85, the value of $f_2/F$ is 0.89, the value of $f_3/F$ is 3.54, and the value of $f_4/F$ is 1.28. Thus, each of Conditions (1)–(6) is satisfied.

FIGS. 10A–12D show various aberrations for Embodiment 3 of the invention. FIGS. 10A–10D show the spherical aberration (for the d, F, and C lines), astigmatism (in the sagittal S and tangential T planes), distortion, and lateral color (for the F and C lines), respectively, at the wide-angle end, FIGS. 11A–11D show these same aberrations at the mid position, and FIGS. 12A–12D show these same aberrations at the telephoto end. As is clear from FIGS. 4A–12D, for each of the above-described embodiments, all said aberrations can be made favorable.

By providing a zoom lens having four lens groups wherein two lens groups move in zooming, the zoom lens can be made compact and lightweight using a small number of lens elements. Further a zoom lens that is telecentric, has a sufficiently long back focus, provides a bright image in which the various aberrations are well-corrected.

The invention being thus described, it will be obvious that the same may be varied in many ways. For example the radii of curvature, and surface spacings may of course be scaled to provide a zoom lens of any desired focal length. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A zoom lens comprising, in sequential order from the object side:

a first lens group having negative refractive power and that is fixed in position during zooming;

a second lens group having positive refractive power;

a third lens group having positive refractive power; and a fourth lens group having positive refractive power that is fixed in position during zooming;

wherein, the second lens group and the third lens group move in a mutual relationship for continuous zooming and correction for what otherwise would be a shifting of the image plane caused by zooming, and the following Condition is satisfied $$\beta_2 \times \beta_3 > -2.2$$

where $\beta_2$ is the lateral magnification of the second lens group at the wide-angle end for an object at infinity, and $\beta_3$ is the lateral magnification of the third lens group at the wide-angle end for an object at infinity.

2. The zoom lens of claim 1, wherein the fourth lens group includes at least one negative meniscus lens element having surfaces of different refractive power, with the stronger refractive power surface on the image side.

3. The zoom lens of claim 2, wherein said negative lens element has a meniscus shape with its convex surface on the object side.

4. The zoom lens of claim 2, wherein said negative lens element satisfies the following condition:

$$\nu < 30$$

where $\nu$ is the Abbe number of said negative lens element.

5. The zoom lens of claim 3, wherein said negative lens element satisfies the following condition:

$$\nu < 30$$

where $\nu$ is the Abbe number of said negative lens element.

6. The zoom lens of claim 1 wherein, during zooming from the wide-angle end to the telephoto end, the second lens group and the third lens group are moved toward the object side and the spacing between these two lens groups becomes smaller.

7. The zoom lens of claim 2 wherein, during zooming from the wide-angle end to the telephoto end, the second lens group and the third lens group are moved toward the object side and the spacing between these two lens groups becomes smaller.

8. The zoom lens of claim 3 wherein, during zooming from the wide-angle end to the telephoto end, the second lens group and the third lens group are moved toward the object side and the spacing between these two lens groups becomes smaller.

9. The zoom lens of claim 4 wherein, during zooming from the wide-angle end to the telephoto end, the second lens group and the third lens group are moved toward the object side and the spacing between these two lens groups becomes smaller.

10. The zoom lens of claim 1 wherein the third lens group consists of a positive lens element and a negative lens element.

11. The zoom lens of claim 2 wherein the third lens group consists of a positive lens element and a negative lens element.

12. The zoom lens of claim 3 wherein the third lens group consists of a positive lens element and a negative lens element.

13. The zoom lens of claim 4 wherein the third lens group consists of a positive lens element and a negative lens element.

14. The zoom lens of claim 5 wherein the third lens group consists of a positive lens element and a negative lens element.

15. The zoom lens according to claim 1, wherein the following conditions are satisfied $$-1.2 < f_1/F < -0.7$$

$$0.7 < f_2/F < 1.5$$

$$1.0 < f_3/F < 4.5$$

$$1.0 < f_4/F < 1.8$$

where

F is the focal length of the zoom lens at the wide-angle end, $f_1$ is the focal length of the first lens group, $f_2$ is the focal length of the second lens group, $f_3$ is the focal length of the third lens group, and $f_4$ is the focal length of the fourth lens group.

* * * * *

UNITED STATES PATENT AND TRADEMARK OFFICE
CERTIFICATE OF CORRECTION

PATENT NO. : 6,204,976 B1
DATED : March 20, 2001
INVENTOR(S) : Nagahara

It is certified that error appears in the above-identified patent and that said Letters Patent is hereby corrected as shown below:

Column 5,
Line 21, change "$L_{10}$biconcave" to -- $L_{10}$ that is biconcave --;
Line 22, change "$L_{12}$biconvex" to -- $L_{12}$ that is biconvex --; and
Line 24, change "$L_{10}$eleventh" to -- $L_{10}$ and the eleventh --.

Signed and Sealed this

Thirteenth Day of November, 2001

Attest:

NICHOLAS P. GODICI
Attesting Officer
Acting Director of the United States Patent and Trademark Office